H. G. FRAZIER.
AUTO DUMP BODY.
APPLICATION FILED JUNE 22, 1920. RENEWED MAR. 8, 1922.
1,428,368.
Patented Sept. 5, 1922.
2 SHEETS—SHEET 1.
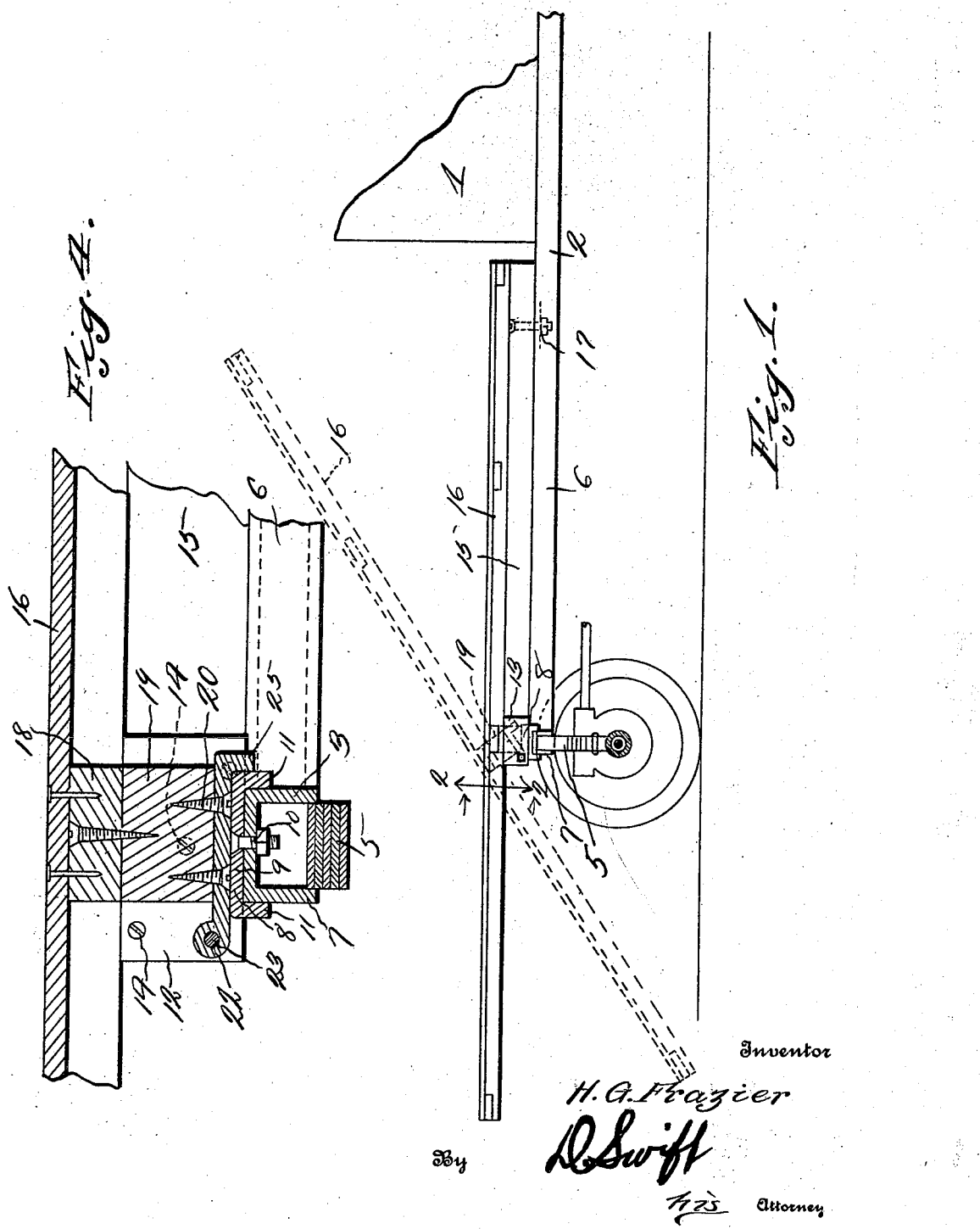

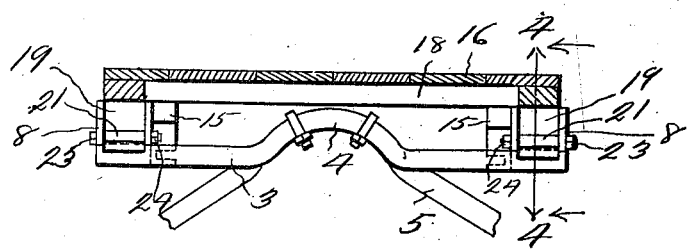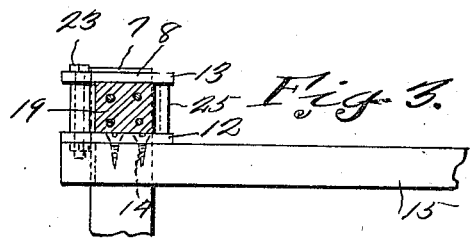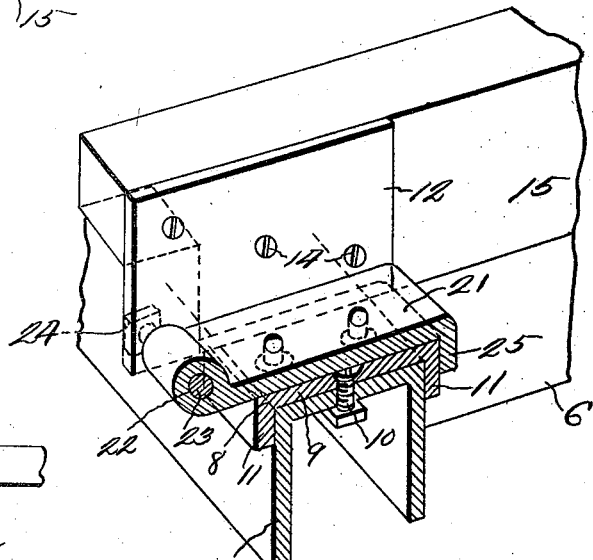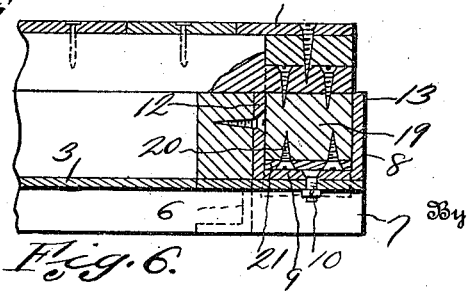

Patented Sept. 5, 1922.

1,428,368

UNITED STATES PATENT OFFICE.

HOMER G. FRAZIER, OF LAFAYETTE, INDIANA.

AUTO DUMP BODY.

Application filed June 22, 1920, Serial No. 390,833. Renewed March 8, 1922. Serial No. 542,170.

*To all whom it may concern:*

Be it known that I, HOMER G. FRAZIER, a citizen of the United States, residing at Lafayette, in the county of Tippecanoe, State of Indiana, have invented a new and useful Auto Dump Body; and I do hereby declare the following to be a full, clear, and exact description of the invention, such as will enable others skilled in the art to which it appertains to make and use the same.

The invention relates to dump bodies for automobiles and has for its object to provide a dump body hinging device which is particularly adapted for use in connection with truck frames wherein the rear transverse rail is arched upwardly for the reception of the rear spring. Also to provide hinging members adapted to be secured to and carried by the outwardly extending portions at the rear of the frame.

A further object is to provide body hinging members comprising plates adapted to be secured to the transverse rail at the rear end of the frame, said plates having upwardly extending longitudinally disposed flanges. To the inner faces of the inner flanges beams are secured which beams are disposed on the side rails of the frame, said flanges being of a greater height than the arching portion of the rear end of the frame. The body proper is provided with downwardly extending blocks, which blocks are disposed between the upwardly extending flanges of each hinged member and have secured to their lower faces plates, which plates are hingdly connected to the upwardly extending flanges of each hinge.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of a portion of a truck showing the hinge applied thereto.

Figure 2 is a transverse sectional view taken on line 2—2 of Fig. 1.

Figure 3 is an enlarged detail plan view of the rear end of the truck frame showing the body supporting blocks between the flanges of the hinges.

Figure 4 is a detail sectional view taken on line 4—4 of Figure 2.

Figure 5 is a detail sectional perspective view of the hinge and a portion of the frame.

Figure 6 is a transverse detail sectional view through one of the hinges and the adjacent part of the frame and dump body.

Referring to the drawings, the numeral 1 designates a truck and 2 the frame thereof. The rear transverse bar 3 of the frame is arched as at 4 for the reception of the rear spring 5 and the hinges hereinafter described are particularly adapted for use in connection with a frame having the rear bar 3 arched as at 4, however, it is to be understood that the hinge may be used for dump bodies of various types of frames. Extending outwardly from the side rails 6 are projections 7, which projections are usually adapted for supporting the vehicle body. In converting the dump body, the old body is removed and hinging members 8 are secured to the projection 7. Each hinging member 8 comprises a plate 9, which rests upon the upper faces of the projection 7 and is held thereon by means of a bolt 10. The front and rear edges of the plate 9 are provided with flanges 11 which overlie the front and rear faces of the projection 7 so that plate 9 will be prevented from movement when placed in position. Rising upwardly from the longitudinal sides of the plate 9 are flanges 12 and 13, to the inner faces of the flanges 12 of each hinge are secured as at 14 longitudinally disposed rails 15, which rails are made of wood and form a bed on which the dump body 16 rests, the forward ends of the rails 15 may be secured by means of bolts 17 to the side rails 6 of the frame, and on which the cross pieces 18 of the dump body 16 also rests. Secured to the sides of the dump body 16, by means of screws or in any other suitable manner, are downwardly extending blocks 19, which blocks are disposed between the flanges 13 and 12 of each hinge, said blocks having secured to their lower faces by means of screws 20, leaves 21 which are pivotally mounted as at 22 on bolts 23. Bolts 23 extend through the plates 12 and 13 and are provided with nuts 24 so that the bolts may be easily removed when it is desired to remove the dump body from the vehicle. The forward ends of the leaves 21 are provided with downwardly extending flanges 25, which overlie the flanges 11 of the plates 9 so that the strain as far as possible will be removed from the bolts 23. It will be seen that when the forward end of the dump body 16 is moved upwardly that the blocks 19 and hinge leaves 21 will also move upwardly on the hinging bolts 23 and that the contents of the body will be deposited on the ground or in any other desired place. It will also be seen that a hinging member is provided wherein the dump body will be disposed sufficiently above the frame so that it will clear the arched portion 4.

When it is desired to remove the body it will be seen that it will only be necessary to remove bolts 10 and bolts 17 or other securing means that may be used instead of the bolt 17 and then lift the body off of the vehicle frame. If it is desired to just remove the body 16, it will be seen that it will only be necessary to remove the bolts 23, which will release the hinge leaves 21 and allow the body 16 to be removed.

From the above it will be seen that a dump body hinge is provided which may be cheaply made and one which may be applied to a truck frame without changing the structure of the frame.

The invention having been set forth what is claimed as new and useful is:—

1. The combination with a vehicle frame, of a dump body therefor, said dump body comprising a body portion having downwardly extending blocks, said blocks being disposed on plates hingedly connected to plates carried by the frame and overlapped flanges carried by said plates and the hinged plates.

2. The combination with a vehicle frame, of a dump body therefor, said dump body being provided with downwardly extending blocks, said blocks being secured to hinged plates, said hinged plates being hingedly connected and guidable between vertical flanges of frame carried plates, and means for securing the frame carried plates to the frame.

3. The combination with a vehicle frame having its rear transverse bar upwardly arched, of a dump body therefor, said dump body being provided with downwardly extending blocks, said blocks being secured to hinged plates hingedly connected in spaced flanges of plates carried by the vehicle frame, rails secured to the inner faces of the inner flanges of each hinge member and forming a bed frame on which the dump body rests, flanges carried by the transverse edges of the frame carrying plates for engaging tranverse portions of the frame, flanges carried by the forward ends of the hinged plates for overlying the forward flanges of the frame carried plates said hinging points being formed by bolts thereby allowing the body as a whole to be removed from the frame.

In testimony whereof I have signed my name to this specification in the presence of two subscribing witnesses.

HOMER G. FRAZIER.

Witnesses:
J. B. CUNNINGHAM,
E. O. GRIFFIN.